No. 882,441. PATENTED MAR. 17, 1908.
R. L. WILSON.
WHEEL HUB.
APPLICATION FILED SEPT. 21, 1907.

WITNESSES

INVENTOR
Ross L. Wilson
BY
ATTORNEYS

UNITED STATES PATENT OFFICE.

ROSS LEE WILSON, OF SALINA, KANSAS.

WHEEL-HUB.

No. 882,441.  Specification of Letters Patent.  Patented March 17, 1908.

Application filed September 21, 1907. Serial No. 393,986.

*To all whom it may concern:*

Be it known that I, ROSS LEE WILSON, a citizen of the United States, and a resident of Salina, in the county of Saline and State of Kansas, have invented a new and Improved Wheel-Hub, of which the following is a full, clear, and exact description.

This invention relates to wheel hubs and is particularly useful in connection with vehicle wheels and the like.

An object of the invention is to provide a simple, strong and durable wheel hub which is dust and oil-proof, by means of which the wheel can be securely mounted upon the axle spindle without danger of accidentally running the wheel off the spindle, and which permits the wheel to be removed when desired, easily and rapidly.

A further object of the invention is to provide a wheel hub adapted for use in connection with vehicle and other wheels, which is so constructed that the wheel is removably mounted upon the axle and is securely held in position without the use of a lock-nut, or other device for a like purpose.

The invention consists in the construction and combination of parts to be more fully described hereinafter and particularly set forth in the claims.

Figure 1:
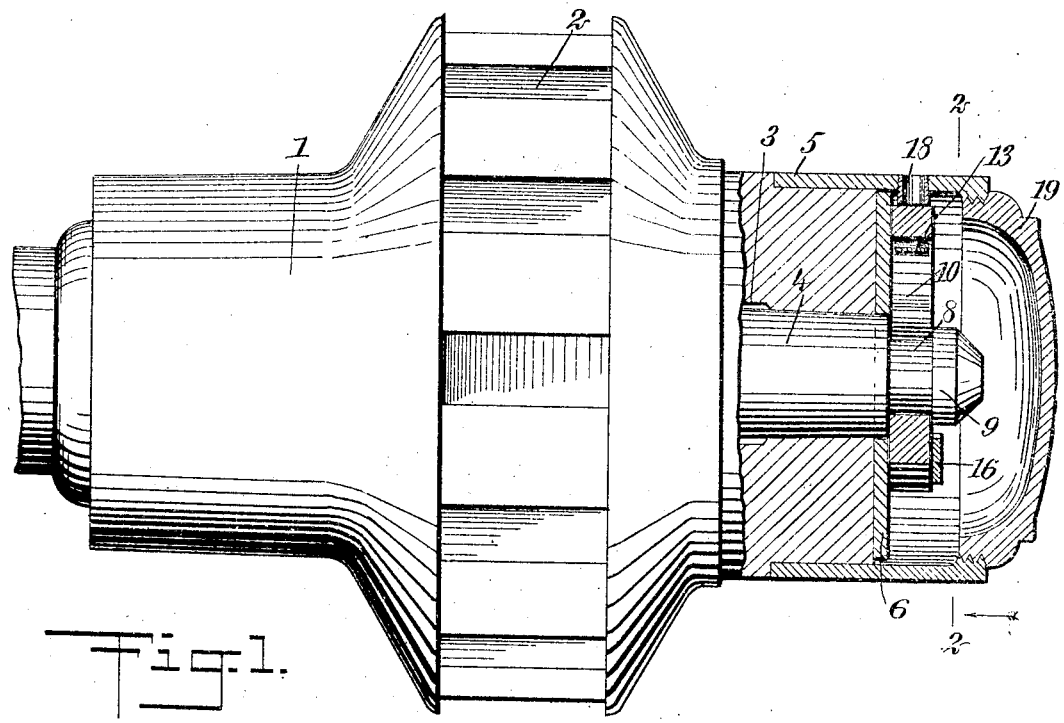
Figure 2:
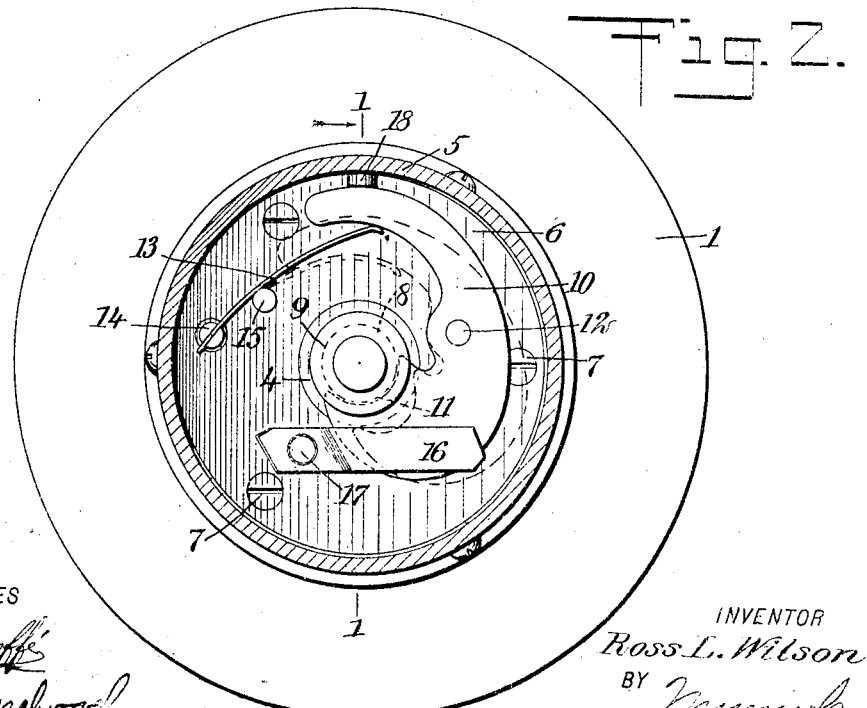

Reference is to be had to the accompanying drawings forming a part of this specification, in which similar characters of reference indicate corresponding parts in all the views, and in which Figure 1 is an elevation of my wheel hub, showing parts in cross-section on the line 1—1 of Fig. 2; and Fig. 2 is a transverse section on the line 2—2 of Fig. 1.

Referring more particularly to the drawings, I provide a hub body 1 which may be of any preferred or common form and which is provided with the usual spoke mortises 2 and with a longitudinal opening 3 by means of which the hub is mounted upon the axle spindle 4. At the outer end of the hub is peripherally mounted the hub band or ring 5 of metal or other suitable material. Within the hub band 5 is located a face-plate 6 secured to the end of the hub by means of screws 7, or in any other suitable manner. At the outer end, the axle spindle 4 has a constricted portion or neck 8 formed between the end of the spindle and a flange or head 9. The neck 8, together with the end of the spindle and the head 9, forms an annular groove for a purpose which will appear hereinafter.

A pawl 10 having at one end a curved face 11, is movably mounted by means of a pivot pin 12, upon the face-plate. The pawl is arranged operatively to engage the annular groove of the axle spindle, with its curved face 11. A spring 13 is secured to the face-plate by means of a split post 14 and is held in engagement with the pawl 10 by means of a post 15. The spring engages the pawl near the end opposite to the curved face 11 and holds the pawl in engagement with the annular groove of the axle spindle. A spring clip 16 is mounted by means of a suitable pin 17, upon the face plate and engages the pawl to hold the same secure against movement in the longitudinal direction of the axle spindle. As the pawl engages the groove of the axle spindle between the flange 9 and the end of the spindle, it securely holds the hub upon the spindle against accidental displacement. The frictional engagement between the spindle and the pawl is slight so that little force is wasted thereby.

The hub band is provided with a threaded opening in which is arranged a correspondingly threaded sleeve 18, through which a tool or instrument may be inserted and forced against the pawl to displace the same from engagement with the spindle, when it is desired to remove the wheel from the latter. The removal of the wheel can be effected rapidly and easily in this manner, as the displacing of the pawl permits the hub to be slid off the spindle without difficulty. When the tool, which, for example, may consist of a nail or punch, is withdrawn from the sleeve 18 the spring 13 instantly returns the pawl to its operative position.

The hub band 5 is interiorly threaded near the outer end, and receives a correspondingly threaded cap 19, which makes the hub dust, oil and moisture-proof while rendering the appearance of the whole neat and compact.

Having thus described my invention I claim as new, and desire to secure by Letters Patent:—

1. A device of the class described, comprising a hub body adapted to be mounted upon an axle spindle, a pivoted member carried by said body and adapted to engage the spindle to hold said body in position, means for holding said member normally in engagement with the spindle, and a holding member secured to said body at a point remote from said pivoted member and extending over the same to secure said pivoted member against movement longitudinal to the spindle, said body having means for permitting the introduction of a tool whereby said member can be displaced to an inoperative position.

2. A device of the class described, comprising a hub body adapted to be mounted upon an axle spindle having an annular groove, a pawl pivotally carried by said body and adapted to engage the groove of the spindle to hold said body in position, a clip secured to said body at a point remote from said pawl and extending over said pawl to secure it against movement longitudinal to the spindle, and a spring for holding said pawl normally in engagement with the spindle, said body having means for permitting the introduction of a tool whereby said pawl can be displaced to an inoperative position.

3. In a device of the class described, the combination with an axle spindle having a flange, of a hub body carrying a pivoted member adapted to engage at said flange to hold said body upon said spindle, said hub body having means for normally holding said member in engagement with said flange, and a holding member mounted upon said body at a point remote from said pivoted member and extending over the same to secure said pivoted member against movement longitudinal to said spindle.

4. A device of the class described, comprising a hub body adapted to be mounted upon an axle spindle, a pawl carried by said body and adapted to engage the spindle to hold said body in position, a spring for holding said pawl normally in engagement with the spindle, a hub band upon said body, and a cap removably mounted upon said band and covering said pawl and said spring said hub band having an opening therethrough, permitting the insertion of a tool to displace said pawl.

5. In a device of the class described, the combination, with an axle spindle having an annular groove, of a hub body carrying a pawl adapted to engage said groove to hold said body in position, said hub body having a spring for holding said pawl in engagement with said groove, a clip for holding said pawl against movement longitudinal to said spindle, a hub band, and a cap removably mounted upon said band, said band having an opening therethrough for permitting the insertion of a tool to displace said pawl.

6. In a device of the class described, the combination, with an axle spindle having an annular groove near the end, of a hub body carrying a pawl at the end face, said pawl being adapted to engage said groove to hold said body in position and having an arm, said hub body having a spring engaging said arm to hold said pawl normally in engagement with said groove, a clip upon said body and extending over said pawl to secure the same against movement longitudinal to said spindle, a hub band, and a cap removably mounted upon said band, said band having an opening therethrough for permitting the insertion of a tool to displace said pawl.

In testimony whereof I have signed my name to this specification in the presence of two subscribing witnesses.

ROSS LEE WILSON.

Witnesses:
C. W. LYNN,
W. T. LINDBLOM.